United States Patent [19]

Johnson

[11] 4,039,716

[45] Aug. 2, 1977

[54] RESIN COATED GLASS FIBERS AND METHOD OF PRODUCING SAME THROUGH USE OF AN AQUEOUS SILANE-CONTAINING SIZING COMPOSITION WHEREBY HYDROLYSIS AND POLYMERIZATION OF THE SILANE IS INHIBITED

[75] Inventor: Carl A. Johnson, Granville, Ohio

[73] Assignee: Owens-Corning Fiberglas Corporation, Toledo, Ohio

[21] Appl. No.: 507,642

[22] Filed: Sept. 20, 1974

[51] Int. Cl.$^2$ .......................... B32B 1/08; B32B 1/10; B32B 17/04; C03C 25/02
[52] U.S. Cl. ............................... 428/378; 57/140 G; 65/3 C; 156/173; 252/8.8; 252/8.9; 427/178; 427/407 B; 428/36; 428/294; 428/391; 428/392
[58] Field of Search ................. 428/36, 294, 378, 391, 428/392; 65/3 C; 57/140 G, 140 C; 252/8.8, 8.9; 427/178, 407 B

[56] References Cited

U.S. PATENT DOCUMENTS

| | | | |
|---|---|---|---|
| 3,193,429 | 7/1965 | Yaeger | 65/3 C |
| 3,249,412 | 3/1966 | Kolek et al. | 65/3 C |
| 3,318,757 | 5/1967 | Atwell | 65/3 C |
| 3,473,950 | 10/1969 | Wong | 65/3 C |
| 3,887,347 | 6/1975 | Reese | 65/3 C |
| 3,936,285 | 2/1976 | Maaghul | 65/3 C |

*Primary Examiner*—J.C. Cannon
*Attorney, Agent, or Firm*—John W. Overman; Philip R. Cloutier; Dennis M. Kozak

[57] ABSTRACT

Glass fibers are coated with a size comprising emulsified particles of a prepolymer having an organo functional silane locked into the protective colloid layer surrounding the particles. In that state silane hydrolysis and polymerization is inhibited. The silane coated prepolymer particles have an overlay of an ethoxylated fatty alkyl radical. The size also contains a lubricant comprising emulsified particles of a white oil coated with a mixture of ethoxylated fatty alcohols, ethoxylated fatty acids, and a diethoxylated fatty amine. The water phase of the size involves a dissolved cationic silane, as for example, gamma-aminopropyltriethoxysilane and dissolved nonionic lubricant, as for example, an ethoxylated fatty acid. The preferred emulsifier for the prepolymer is a polyoxypropylene-polyoxyethylene adduct. The size is made by adding an organo functional silane monomer to the emulsion of the prepolymer so that the silane adds to the oil phase. Thereafter the water solution of the silane and the water soluble lubricant are added, followed by the emulsion of the oil.

5 Claims, No Drawings

RESIN COATED GLASS FIBERS AND METHOD OF PRODUCING SAME THROUGH USE OF AN AQUEOUS SILANE-CONTAINING SIZING COMPOSITION WHEREBY HYDROLYSIS AND POLYMERIZATION OF THE SILANE IS INHIBITED

BACKGROUND OF THE INVENTION

The art of producing glass fibers as a reinforcement for thermoplastic and/or thermosetting resins has long known to coat the fibers with an organic polymer before embedding the coated fibers in the laminating resin. The fibers are most economically coated with the polymers at forming. Because the fibers are formed immediately beneath red hot bushings having orifices therein through which the molten glass passes before solidifying into the fibers, the solidified fibers are best coated with an aqueous emulsion of the polymer in order to avoid a fire hazard. Numerous problems exist in the process of applying a prepolymer to the glass fibers from a water phase. One problem is that the size that is used to coat the fibers contains a high percentage of water which causes migration of the size solids during drying of the coiled packages of the coated fibers. Additional water also requires additional drying, which when accomplished by a gas-fired oven produces additional discoloration of cationic materials. In addition, the silanes which are added to the size slowly hydrolyze on standing, and in doing so agglomerate. The emulsified particles of the prepolymer may also slowly agglomerate on standing, and the coating on the fibers of the agglomerated material usually leaves some areas of the fibers devoid of a coating. When incompletely coated fibers are used as a reinforcement for laminating resin, a poor bond of the laminating resin to the fibers results in certain areas and these areas then breakdown under repeated reversals of stress.

DESCRIPTION OF THE PREFERRED EMBODIMENTS

It is an object of the present invention to produce coated fibers for use as a reinforcement for thermoplastic and/or thermosetting laminating resins and which coated fibers are more uniformly coated and have a thicker coating than has been provided heretofore with similar materials. It is a further desire to produce sizes of high prepolymer concentrations which are more stable over a greater length of time than are prior art sizes made of the same prepolymers. It is also desired to produce sizes which more adequately lubricate the fibers in a wet condition so that fewer of the fibers become abraided prior to the time that the wetted fibers are dried and the coating of the prepolymer produced. It is a further desire to produce an emulsion of a lubricant which more adequately protects the fibers from abrasion while the water is present and which at the same time does not interfere with the wetting out of the surface of the glass fibers by the prepolymer during the drying operation. It is a further desire to provide a cationic lubricant containing nitrogen which does not discolor when dried in a gas-fired oven.

Obviously, a coating material which achieves the above desired objectives will provide a material that is a considerable improvement over the prior art, and the particulars of these materials will now be given in the following examples.

EXAMPLE 1

A size was made of the following materials given in parts by weight:

| Materials | Parts by Wt. |
| --- | --- |
| Emulsion of the reaction product of bisphenol A and epichlorohydrin having an average epoxy equivalent weight of 240 stabilized with an adduct of polypropylene oxide and polyethylene oxide having a molecular weight of 400 (56% solids) | 66.22 |
| Lubricant: 30% white oil, 30% ethoxylated fatty acid, 30% ethoxylated myristyl alcohol, 10% diethoxylated fatty amine | 3.76 |
| Polyethylene glycol 400 monostearate | 15.36 |
| Acetic acid | 3.01 |
| Methacryloxypropyltrimethoxy-silane | 14.03 |
| Gamma-aminopropyltrimethoxy-silane | 3.76 |
| Deionized water | 728.87 |

In the above lubricant, the ethoxylated fatty alcohol is $C_{14}H_{29}O(C_2H_4O)_nC_2H_5OH$, the ethoxylated fatty acid is

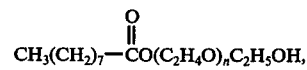

and the diethoxylated fatty amine is

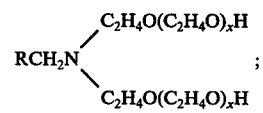

wherein R is a mixture of fatty alkyl radicals of from $C_4$ to $C_{18}$ inclusive; $n$ is a number to provide an average molecular weight of 400 and $x$ is a number to provide an average molecular weight of 200.

The size was prepared by adding 8 parts of deionized water to a mixing kettle followed by the emulsion of the prepolymer. Thereafter the methacryloxypropyltrimethoxysilane was added and mixed for 5 minutes, following which 160 parts of water were added and mixed for 15 minutes.

In another mixing kettle 80 parts of deionized water were added and the gamma-aminopropyltrimethoxysilane was added thereto with mixing. Thereafter the acetic acid was added and mixed, and the mixture was then added to the previously mixed prepolymer and silane emulsion. The polyethylene glycol 400 monostearate, and the mixture of white oil, ethoxylated alcohol, ethoxylated fatty acid, and diethoxylated fatty amine were melted therewith, and water at 140° F added with mixing to produce an emulsion. Thereafter an additional 80 parts of deionized water was added with mixing, and the mixture was then added to the emulsion of the prepolymer. The size was stable over a period of at least 72 hours.

The size was applied to 2080 E-glass fibers using a rolltype applicator, following which the fibers were grouped together into a strand and the strand was wrapped upon a revolving mandrel to produce a package. The strand had very good forming properties with no fuzz. The 45-pound package was placed in an oven heated to 235° F, and was dried for 42 hours. Four strands were grouped together to form a bundle that was used to produce filament wound pipe by passing the strands through a resin bath comprising a solution containing 100 parts by weight of Dow Chemical Co. DER 331 epoxy resin and 14 parts by weight of meta phenylenediamine curing agent and thereafter bringing the coated strands together to form the bundle. The resin has the following formula:

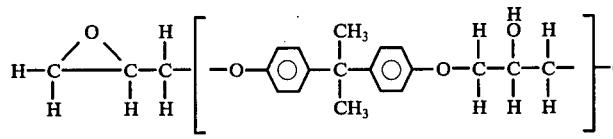 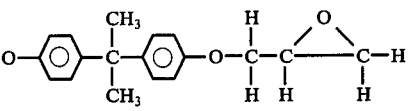

The coated strand was pulled through the guide eyes of the filament winding apparatus and was then wound upon a mandrel at a helix angle of 54° to provide a pipe having an inside diameter of 2.235 inches and a wall thickness of 0.075 inches. The resulting filament wound material was cured at 275° F for 1 hour. The pipe had a fiber loading of 66% and when tested according to ASTM Spec. D-2143 withstood 4,000 pressure cycles between 0 and 1100 psi before electrical conductivity was established through the pipe.

The weeping of filament wound pipe is believed attributed to a fatigue failure between the laminating resin and the glass fiber reinforcement resulting in fatigue cracks in the now unreinforced laminating resin. In order to get an improvement in this cycle to weep test, therefore, either a stronger bond must be produced between the laminating resin and the glass fiber reinforcement, or a reduction in the number of broken glass filaments must be provided in the roving. It is believed that the size of the present invention more adequately lubricates the fibers against abrasion while passing over guide surfaces both in the wet condition and in the dry condition to reduce the number of broken filaments; and in addition, produces a better bond between the glass fibers and the coating produced thereon.

As previously indicated, the above described strand processed very well and produced substantially no fuzz. The assignee of the present invention has an "abrasion gate" machine for evaluating the amount of fuzz produced by fibers. The abrasion gate machine comprises intermeshing top and bottom frames of horizontal rods. The bottom frame is stationary and comprises eleven 3/16 inch diameter chrome plated steel pins. The upper frame has 10 similar pins similarly spaced and arranged so that its pins fit into the spaces between the rods of the bottom frame. All of the pins have a 10 microinch finish. The abrasion gate is mounted in a box having a false bottom made of 50 × 50 mesh wire screen. Suction is applied to the bottom beneath the screen to cause an air flow over the rods to pull fuzz generated on the rods down onto the screen. The strand to be tested is strung between the upper and lower frames, and the upper frame is forced down onto the lower frame with a force of 0.30 pound. After 400 yards of strand are pulled through the apparatus, the fuzz collected on the screen is weighed, and the tension required to pull the strand through the gate is measured. The dry strand produced as above described when pulled through the Finger Gate apparatus required a tension of 330 grams, and no fuzz was collected.

By way of contrast, and not according to the invention, a different commercial strand required a tension of 355 grams, and 9 samples gave a minimum amount of fuzz of 7.9 milligrams and a maximum amount of 9.6 milligrams per sample.

EXAMPLE 2

The process of Example 1 was repeated excepting that the strand was pulled through a bath of a commercial polyvinyl ester resin, instead of the epoxy resin of Example 1. The filament wound pipe required 3,156 cycles to weep when stressed between 0 and 1150 psi.

By way of contrast, a pipe prepared similarly excepting that the fibers used were different commercially available products withstands only 1,302 pressure cycles.

In a further test, Naval Ordinance Laboratory test rings were made according to ASTM Spec. D-2291 using the strand of Example 1 and the Derakane resin 411-45, and were tested according to ASTM Spec. D-2344-72. The test ring had a resin content of 18.7%, and had a tensile strength of 8,460 psi dry. After boiling for 24 hours in water at atmospheric pressure the rings had a strength of 8,190 psi.

By way of contrast, and not according to the invention, a different commercially available strand when similarly tested had a strength dry of 8,080 psi, and after 24 hours of boiling had a strength of 7,730 psi. The rings had a resin content of 21.6%.

EXAMPLE 3

The process of Example 2 is repeated excepting that an emulsion of a polyester resin is used for the coating of the glass in place of the emulsion of the epoxy materials. The polyester is made by cooking 1 mole of orthophthalic anhydride, 1 mole of succinic anhydride, and 2.4 moles of propylene glycol to an acid value of 30 to 35. An emulsion is made thereof from the following materials:

| Materials | % By Wt. |
|---|---|
| Above polyester prepolymer | 47.5 |
| Xylene | 5.3 |
| Diacetone alcohol | 10.6 |
| Wyandotte Chemical Co. Pluronic L101 emulsifier | 2.6 |
| Wyandotte Chemical Co. Pluronic P105 emulsifier | 7.6 |
| Water | 26.2 |

The emulsion is made by thinning the polyester with the xylene. In another vessel the emulsifying agents are diluted with the diacetone alcohol, and thereafter the diacetone alcohol solution of the Pluronics is added to the polyester solution with agitation until a homogeneous mixture is produced. Thereafter the water is slowly added to the main mix with agitation until the inversion point is reached, following which the balance of the water is slowly added with agitation to produce a stable emulsion. The coated strand produced using this polyester film former processes substantially as well as the epoxy size of Example 2 during the wet and dry conditions, and gives substantially no fuzz when pulled through the abrasion gate apparatus.

EXAMPLE 4

The process of Example 3 is repeated excepting that Wyandotte Chemical Company X-1042 polyurethane latex (50% solids) is substituted for the emulsified polyester of Example 3. The coated strand so produced processes as well during the wet and dry stages as do the materials of Examples 2 and 3, and produces no fuzz when pulled through the abrasion gate apparatus.

EXAMPLE 5

The process of Example 1 is repeated excepting that gamma-glycidoxypropyltrimethoxysilane is substituted for the gamma-methacryloxypropyltrimethoxysilane. This material processes as well during the wet and dry stages, and gives substantially the same strength as do the materials of Example 1.

EXAMPLE 6

The process of Example 1 is repeated excepting that beta-mercaptoethyltrimethoxysilane is substituted for the gamma-methacryloxypropyltrimethoxysilane. The strand so produced processes as well during the wet and dry stages, and has substantially the same strength as do the materials of Example 1.

EXAMPLE 7

The process of Example 1 is repeated excepting that polyethylene glycol 400 monooleate is substituted for the polyethylene glycol 400 monostearate, and the strand so produced has substantially the same properties as do those of Example 1.

EXAMPLE 8

The process of Example 1 is repeated excepting that corn oil is substituted for the white oil of the lubricant given in Example 1, and the strands so produced has substantially the same properties as do those of Example 1.

EXAMPLE 9

The process of Example 1 is repeated excepting that a 50-50 mixture of nonylphenoxypoly(ethyleneoxy)ethanol molecules having 1.5 ethylene oxide groups per molecule and 40 ethylene oxide groups per molecule is used as the emulsifier instead of the adduct of polypropylene oxide and polyethylene oxide of Example 1. The strands so produced has substantially the same strength and low fuzz as do those of Example 1.

EXAMPLE 10

The process of Example 7 is repeated excepting that n-beta(aminoethyl) gamma-aminopropyltrimethoxysilane is used in place of the gamma-aminopropyltrimethoxysilane. The strand so produced has substantially the same properties as does the strand of Example 1.

It will now be apparent that the present invention provides an improvement over the prior art in the following respects:

1. An organo functional silane monomer is added to the emulsion of the coating prepolymer without hydrolyzing the silane prior to its addition, so that the silane becomes part of the oil phase and is taken up in the emulsifying agent on the surface of the prepolymer particles. In this location the silane monomer probably orients with the silane adjacent the prepolymer with the long organo radical projecting out of the surface. A polyoxypropylene-polyoxyethylene adduct is a preferred emulsifier of the prepolymer for reasons which will later be apparent. Immediately after the addition of the silane to the emulsion of the prepolymer, a water solution of an ethoxylated fatty alkyl radical is added, and this material overcoats the silane in the surfactant layer to temporarily lock up or encase the silane on the surface of the prepolymer particles. By this mechanism the rate of hydrolysis of the silane is reduced and greater emulsion stability is achieved at high mix solids.

2. In addition to using a silane which is locked up in the emulsifier of the prepolymer, a dissolved cationic silane monomer is used in the aqueous layer. The dissolved silane is available immediately to adhere to the glass on contact of the water therewith to provide protection for the glass immediately after the initial contact. The dissolved silane is beneficial even though the silane has no functionality for bonding with the laminating resin.

3. Further protection for the glass fibers in the wetted condition is provided by an ethoxylated fatty radical dissolved in the water layer.

4. An improved emulsified lubricant is provided which moves to the surface of the glass in an emulsified condition while the fibers are wet with water, and which later moves away from the surface of the glass during drying to permit the prepolymer having the silane locked into its surface to better wet out the surface of the glass fibers. This flip-flop of the emulsified particles of oil is accomplished by using surfactants, all of which are ethoxylated, and one of which is a diethoxylated alkyl amine. This amine is cationic in a water layer, and loses its cationicity when dried. The amine further is loosely bound to the remainder of the emulsifying materials by secondary forces, inasmuch as they all have long ethoxylated chains oriented outwardly of the surface of the particles. Upon drying the emulsion is believed to invert from an aqueous emulsion to an oil emulsion, and the ethoxylated chains join together into a nucleus with their oily tails on the surface. When this occurs, they move away from the surface of the glass and make way for the prepolymer particles. Further advantages are had by using a soluble lubricant in the oil phase which also has an ethoxylated chain.

One or more of the above improvements can be used by itself or in combination with the others.

It will not be apparent that the film former for the coating material can be any oleophilic polymer, either thermoplastic or thermosetting, and will include polyesters, alkyds polyurethanes, polypropylene, polyethylene, amides such as nylon, acetyl resins, formaldehyde condensates, phenol-formaldehyde condensates, elastomers such as polybutadiene, butadiene-styrene, butadiene-acrylonitrile, vinyl polymers such as polyvinyl chloride, polyvinyl acetate, the methacrylates, tetrafluoroethylene, etc..

The organo functional silane which is added to the oil phase can be any oleophilic silane, such as carboxyphenylsilane, allylsilane, vinylsilane, vinyltriethoxysilane, vinyl-tris (beta methoxyethoxy)silane, gamma-glycidoxypropyltrimethoxysilane, beta-(3,4 epoxycyclohexyl)-ethyltrimethoxysilane, etc..

The prepolymer may be emulsified using any nonionic emulsifying agent, but the preferred emulsifying agents are adducts of polyoxypropylene and polyoxyethylene. The surfactants which are dissolved into the water phase and which are used to cover the silane on the prepolymer particles can be any fatty ether or ester of a polyoxyethylene or polyglycol; and the cationic silane that is dissolved in the water phase for the immediate coating of the glass fibers, can be any nitrogen containing silane, as for example, the gamma-aminosilanes, N(B-aminoethyl) gamma-aminopropyltrimethoxysilane, normal-phenyl-gamma-aminopropyltrimethoxysilane, m-aminophenyltriptychsiloxazolidine, normal-beta-(aminoethyl) gamma-aminopropyltrimethoxysilane, etc..

The fugitive cationic lubricant which is attracted to the glass in the wet condition and which moves away from the glass while drying can be made from any oil, either saturated or unsaturated, but is preferably saturated where changes in color, etc. are not wanted. A saturated petroleum white oil is such a preferred material. The oil is emulsified using ethoxylated fatty alkyl materials, or materials containing fatty alkyl radicals, such as the radicals of fatty alcohols, or fatty acids, or the comparable alkyl chain devoid of the ether or ester linkages. Such can be made for example by reacting a fatty acid with amines to form a nitrile followed by the removal of water from the nitrile, followed by hydrogenation to produce the primary amine of the fatty material. A mixture of chain lengths of the fatty materials is preferable and this is easily accomplished by using a mixture of ethoxylated fatty alcohols, and ethoxylated fatty acids. Such materials are then made cationic by mixing with diethoxylated amines which also contain such a fatty alkyl radical. Preferred materials contain 20 to 75% of an ethoxylated fatty alcohol, 20 to 75% of an ethoxylated fatty acid, and 5 to 60% of an ethoxylated fatty amine.

Preferred size compositions will comprise the following materials in percent by weight of solids:

| Materials | % By Weight | Preferred % |
|---|---|---|
| Emulsion prepolymer solids stabilized by an adduct of polyoxypropylene and polyoxyethylene | 33 – 66 | 51.5 |
| Emulsified solids of an oil stabilized by an ethoxylated fatty amine | 3 – 10 | 5.5 |
| Polyethylene glycol of a fatty radical | 10 – 35 | 21 |
| Nonionic trialkoxysilane | 5 – 25 | 15.2 |
| Cationic trialkoxysilane | 1 – 15 | 3.3 |
| Acetic acid | 0 – 5 | 3.5 |

The size as applied to the fibers may contain from 2 to 20% solids, and ideally approximately 9 to 10% solids. It will now be seen that in the most preferred size arrangement, all of the surfactants that are used have a common denominator in that they include ethoxylated chains. By doing so, all of the surfactants can group together in the drying phase as the emulsion inverts into an innocuous material coated with fatty radicals which cause such particles to then become lubricants which are generally nonionic, and which will move away from the glass. After drying, it then coats the surface of the polymer coating that is formed on the glass. Even in this position, such materials are innocuous when the polymer coated fibers are immersed in the laminating resin, since they again can move into the laminating matrix and become compatible therewith.

It will now be seen that the present invention has combined a number of advancements in the art, one or more of which can be used separately, but which ideally combine with each other to produce compatibility not achieved heretofore. The locking up of a silane in the surfactant layer of the prepolymer to prevent its hydrolysis and polymerization is, to the writer's knowledge, novel and will contribute stability of any oleophilic silane used in any size. The inclusion of ethoxylated fatty material over the top of the silane, likewise can be used in any size composition where silanes are used. The preparation and use of a cationic lubricant wherein the cationicity is imparted by the surfactant and not the oil itself and wherein each of its surfactants contain ethylene oxide chains can also be used with benefit in other size formulations with or without the other improved size materials previously referred to. The specific combination of all of the materials, however, has benefits wherein the surfactants invert and combine during the drying stage into innocuous materials which leave the vicinity of the glass. In those instances where acetic acid is specified in a size, it will be understood that it is used for pH adjustment only, that other acids can be used, and that it is not an essential part of the size coating.

While the invention has been described in considerable detail, I do not wish to be limited to the particular embodiments shown and described, and it is my intention to cover hereby all novel adaptations, modifications, and arrangements thereof which come within the practice of those skilled in the art and which fall within the purview of the following claims.

I claim:

1. Glass fibers coated with the dried residue of an aqueous dispersion comprising the following solids in percent by weight:

| Materials | % By Weight |
|---|---|
| Emulsion prepolymer [solids] stabilized by an adduct or adducts of polyoxypropylene and polyoxyethylene | 33– 66 |
| Emulsion [solids] of an oil stabilized by an ethoxylated fatty amine | 3 – 10 |
| Polyethylene glycol fatty radical adduct | 10 – 35 |
| Nonionic trialkoxysilane | 5 – 25 |
| Cationic trialkoxysilane | 1 – 15 | said nonionic trialkoxysilane having been (1) added directly to said emulsion prepolymer stabilized by an adduct or adducts of polyoxypropylene and polyoxyethylene and (2) overcoated with said emulsion of an oil stabilized by an ethoxylated fatty amine to effect locking up of said nonionic trialkoxysilane in the surfactant layer of said emulsion prepolymer.

2. The glass fibers of claim 1 wherein the prepolymer is a bisphenol A-diepoxide reaction product.

3. The glass fibers of claim 1 wherein said emulsion of an oil comprises from 20 to 40% of an ethoxylated fatty acid, from 20 to 40% of an ethoxylated fatty alcohol, from 5 to 15% of diethoxylated fatty amines, and the balance being an oil.

4. The glass fibers of claim 1 comprising the following solids in approximate percentages by weight:

| Materials | % By Weight |
|---|---|
| Emulsion prepolymer stabilized by an adduct of polyoxypropylene and polyoxyethylene | 53.7 |
| Emulsion of an oil stabilized by an ethoxylated fatty radical and a diethoxylated fatty amine | 5.5 |
| Polyethylene glycol-adduct fatty radical | 22.3 |
| Nonionic trialkoxysilane | 15.2 |
| Cationic trialkoxysilane | 3.3 |

5. The glass fibers of claim 1 wherein said nonionic silane is an acryloxypropyltrialkoxysilane, and said cationic silane is a gamma-aminopropyltrialkoxysilane.

* * * * *